(12) United States Patent
Ushio et al.

(10) Patent No.: US 8,291,566 B2
(45) Date of Patent: Oct. 23, 2012

(54) WORK TRANSFER APPARATUS, AND WORK MOUNTING METHOD

(75) Inventors: Shozo Ushio, Toyota (JP); Hideyuki Murayama, Toyota (JP); Masafumi Uchihara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 335 days.

(21) Appl. No.: 12/666,692

(22) PCT Filed: Jul. 25, 2008

(86) PCT No.: PCT/JP2008/063824
§ 371 (c)(1),
(2), (4) Date: Dec. 24, 2009

(87) PCT Pub. No.: WO2009/017213
PCT Pub. Date: Feb. 5, 2009

(65) Prior Publication Data
US 2010/0319193 A1 Dec. 23, 2010

(30) Foreign Application Priority Data

Jul. 27, 2007 (JP) ................................. 2007-196044

(51) Int. Cl.
*B23Q 17/00* (2006.01)
*B23P 19/00* (2006.01)
(52) U.S. Cl. ...................... 29/407.08; 29/822
(58) Field of Classification Search ............ 29/407.08, 29/468, 407.01, 407.04, 700, 701, 703, 709, 29/714, 743, 759, 760, 800, 822, 897.2; 294/907, 294/65; 901/2
See application file for complete search history.

(56) References Cited

U.S. PATENT DOCUMENTS
3,824,674 A 7/1974 Takeyasu et al.
(Continued)

FOREIGN PATENT DOCUMENTS
DE 10 2004 034537 B3 5/2006
(Continued)

OTHER PUBLICATIONS

European Supplementary Search Report dated Jan. 4, 2011; Chinese Office Action dated Mar. 3, 2011 and English translation thereof; Japanese Office Action Jan. 5, 2010 and English translation thereof.

*Primary Examiner* — John C Hong
(74) *Attorney, Agent, or Firm* — Kenyon & Kenyon LLP (57) ABSTRACT

According to a work mounting method by the work transfer apparatus of the prior art, a glass plate or a work may fail to abut against a window frame homogeneously at its peripheral edge portion, and the adhesion strength or the sealing property between the glass plate and the window frame may not be retained all over the periphery of the adhered portion. Provided is a work transfer apparatus, which grips a rear glass by its gripping member and mounts the rear glass while pushing the gripped rear glass onto the window frame of a car body by the action of a supporting arm. The work transfer apparatus comprises a control device, and each of absorption pads of the gripping member includes a force detecting sensor for detecting the force to be applied to the absorption pads. The control device controls, when it uses the work transfer apparatus to mount the rear glass on the window frame, the actions of the supporting arm on the basis of the magnitude of the detected value of the force detecting sensor of each absorption pad.

8 Claims, 10 Drawing Sheets

← Conveying Direction Of Vehicle

U.S. PATENT DOCUMENTS

| | | | |
|---|---|---|---|
| 4,813,732 A | | 3/1989 | Klem |
| 4,852,237 A | * | 8/1989 | Tradt et al. .................. 29/407.05 |
| 5,303,034 A | * | 4/1994 | Carmichael et al. .......... 356/620 |
| 5,609,377 A | * | 3/1997 | Tanaka ............................ 294/65 |
| 5,633,450 A | * | 5/1997 | Suslow et al. ............... 800/317.4 |
| 2001/0045755 A1 | | 11/2001 | Schick et al. |
| 2003/0113192 A1 | | 6/2003 | Ransom |

FOREIGN PATENT DOCUMENTS

| | | |
|---|---|---|
| EP | 1 642 693 A1 | 4/2006 |
| JP | 60-259394 A | 12/1985 |
| JP | 04-171144 A | 6/1992 |
| JP | 07-081641 A | 3/1995 |
| JP | 07-124881 A | 5/1995 |
| JP | 09-002349 A | 1/1997 |
| JP | 10-146781 A | 6/1998 |
| JP | 10-264867 A | 10/1998 |
| JP | 11-115838 A | 4/1999 |
| JP | 11-198077 A | 7/1999 |
| JP | 11-240474 A | 9/1999 |
| JP | 11-245124 A | 9/1999 |
| JP | 2000-084881 A | 3/2000 |
| JP | 2001-075649 A | 3/2001 |
| JP | 2003-011080 A | 1/2003 |
| JP | 2004-148486 A | 5/2004 |
| JP | 2004-359069 A | 12/2004 |
| JP | 2006-059156 A | 3/2006 |
| JP | 2007-245326 A | 9/2007 |
| WO | 2007063606 A1 | 6/2007 |

* cited by examiner

FIG. 1

← Conveying Direction Of Vehicle

WORK TRANSFER APPARATUS, AND WORK MOUNTING METHOD

This is a 371 national phase application of PCT/JP2008/063824 filed 25 Jul. 2008, claiming priority to Japanese Patent Application No. 2007-196044 filed 27 Jul. 2007, the contents of which are incorporated herein by reference.

FIELD OF THE INVENTION

The present invention relates to a work conveying apparatus and work assembling method, holding a work, conveying the work to a work-assemble position of the assembling object, pressing the work to the assembling object, and assembling the work to the work-assemble position.

BACKGROUND OF THE INVENTION

Conventionally, in the assembly line of a vehicle, when a work is assembled to the vehicle, which is difficult for an operator to transfer, set, or assemble (called "a large work" involving a front window or a rear window), a work conveying apparatus is used, which assists to support the work, reduces the load to support the work for the operator, and which assists to convey the work, reduces the load to operate the work. Thus, such the work conveying apparatus is known as a power assist apparatus.

As the work conveying apparatus, JP-A-11-245124 discloses the work lifting apparatus including a holder and a supporter, the holder holds the work, the supporter moves the holder vertically and supports to the holder with inclination. This work lifting apparatus detects the inclination of the holder operated by the operator and lifts the holder by the supporter on the detected direction and angle about the inclination of the work.

Typically, the apparatus transfers the work to an assembling object, and assembles to an assemble position of the assembling object. When assembling to the assemble position, pressing the work to the assemble position, the apparatus assembles the window to the assembling object without fault.

Especially, if the work is a window involving a front window or a rear window, the work is assembled to a window-frame as the assembling object with a peripheral edge thereof coated by an adhesive. In order to adhere the window to the frame and to obtain adhesion strength and sealing property between the window and the frame all over the adhered periphery, the adhesive coating the peripheral edge of the window should be equally squashed and spread, pressing the peripheral edge of the window equally to the frame.

Figure 12:
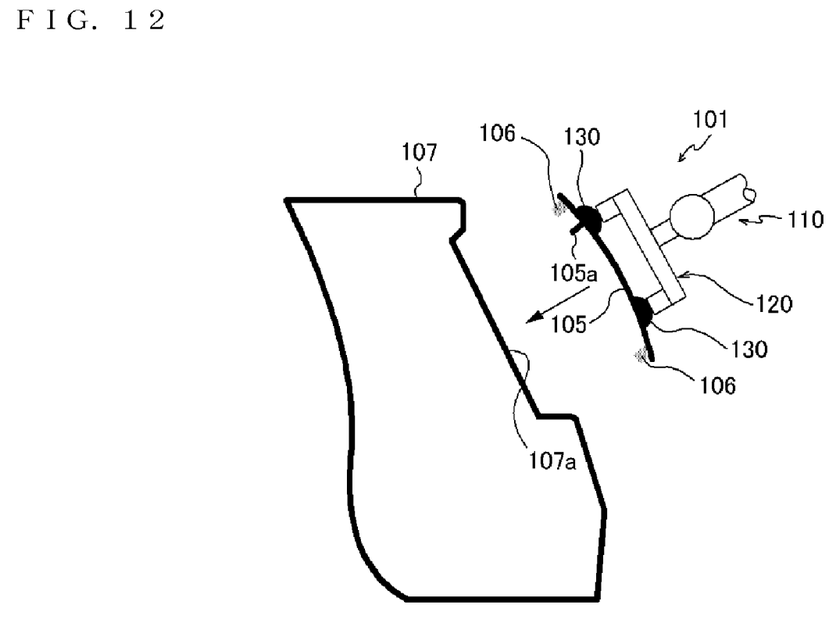
FIG. 12 is a side view showing the state the conventional work conveying apparatus assembles the window to the frame.

As shown in FIG. 12, when a work conveying apparatus 101 assembles a window 105 to a frame 107 of a vehicle body 107a, holding the window 105 by pads 130 disposed at a hold member 120 of the work conveying apparatus 101, transferring the window 105 to the frame 107a, assembling the window 105 to the frame 107a, the window 105 is pressed to the frame 107a by a robot arm 110 via the hold member 120.

When the window 105 is assembled to the frame 107a, inserting an up-stopper 105a (a portion formed in a craw shape) disposed at the upper side of the window 105 to a hole formed in the frame 107a, the window 105 assembled to the vehicle 105 is prevent from falling therefrom. Here, some pads 130 transfering the pressure from the arm 110 to the window 105 are disposed near the up-stopper 105a to insert the up-stopper 105a to the hole of the frame 7a without fault.

Figure 13:
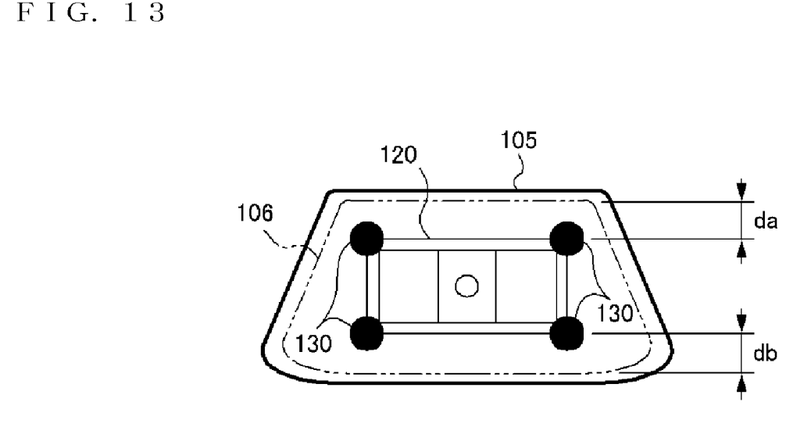
FIG. 13 is a rear view showing the holding member holding the window with equal dimensions from the upper-end of the window to upper pads in the holder and from the lower-end of the window to lower pads in the holder, in the conventional apparatus.

As shown in FIGS. 12 and 13, an adhesive 106 for adhering the window 105 to the frame 107a coats the peripheral edge of the window 105. The pads 130 for equally squashing the adhesive 106 all over the periphery are disposed with equal dimensions from the peripheral edge of the window 105 (as shown in FIG. 13, the pads 130 are disposed with dimensions da from the upper-end of the window 105 to the upper pads 130 and with dimensions db from the lower-end of the window 105 to the lower pads 130, the dimensions da and db are substantially same). As a result, the peripheral edge of the window 105 is contacted to the frame 107a with equal pressure.

Figure 14:
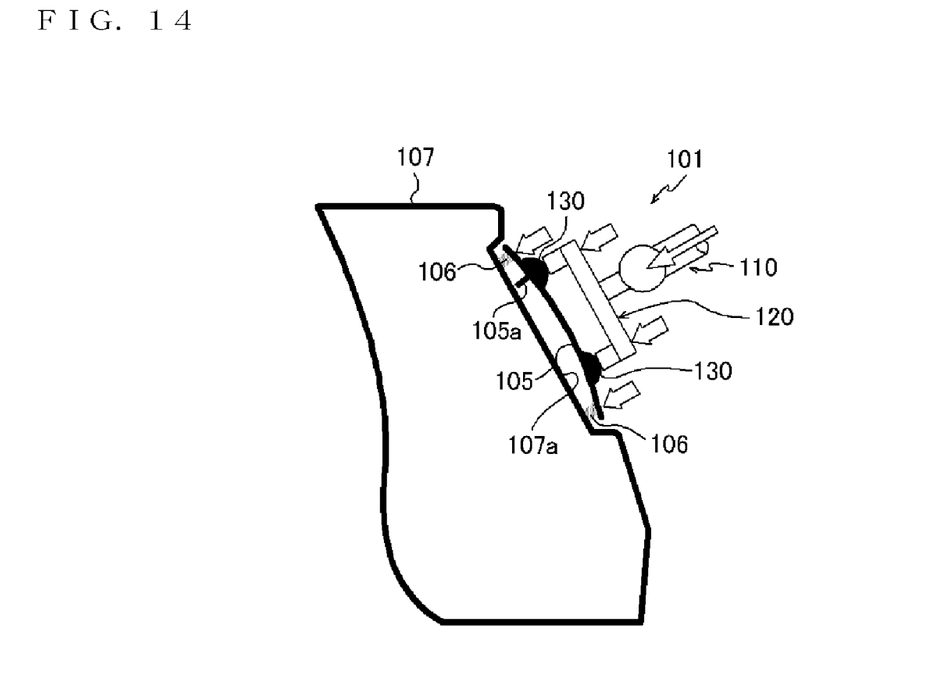
FIG. 14 is a side view showing the state contacting equally all over the peripheral edge of the window to the frame, when the holding member holds the window with equal dimensions from the upper-end of the window to upper pads in the holder and from the lower-end of the window to lower pads in the holder, and pressed it to the frame.

Thus, disposing the pads 130 with equal dimensions da and db shown in FIG. 14, when the hold member 120 is pressed with robot arm 110 to apply equal pressing force to the window from each of the pads 130, all over the peripheral edge of the window 105 is equally contacted to the frame 107a.

However, because of the variation in the holding position of the window 105 with the hold member 120, or the variation in the position of the vehicle transferred in the line against the apparatus 101, the pressing forces applied to the pads 130, 130 against the window 105 are not equal, all over the adhesive 106 coating the peripheral edge of the window 105 may not be equally squashed.

In the line assembling the various types of vehicle, what is called "the composite line," the windows 105 are different in size or form within the vehicle types. Thus, the common hold member for all vehicle types is desired, including the plural pads 130, 130 for holding the window 105, in the light of the capital cost, production efficiency of the product line, and so on. Without changing the arrangement of the pads 130, 130, the hold member 120 (one-type hold member) is desired to hold the windows 105 with different sizes and forms.

Thus, in order to use the common hold member about all types of the window 105, typically, the pads 130, 130 are arranged to hold the smallest-size window 105.

Figure 15:
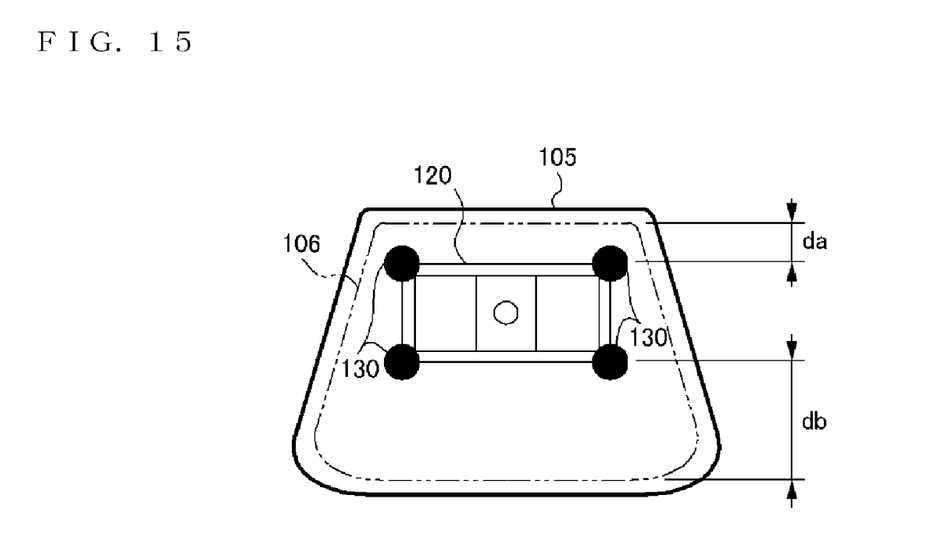
FIG. 15 is a rear view showing the holder member holding the window with equal dimensions from the upper-end of the window to upper pads in the holder and from the lower-end of the window to lower pads in the holder, in the conventional apparatus.

However, when the large-size window 105 is held by the hold member 120 mentioned above, the upper-end side pads 130 is disposed near the up-stopper 105a as shown in FIG. 15, so that the lower-end side dimension db becomes longer than the upper-end side dimension da.

Figure 16:
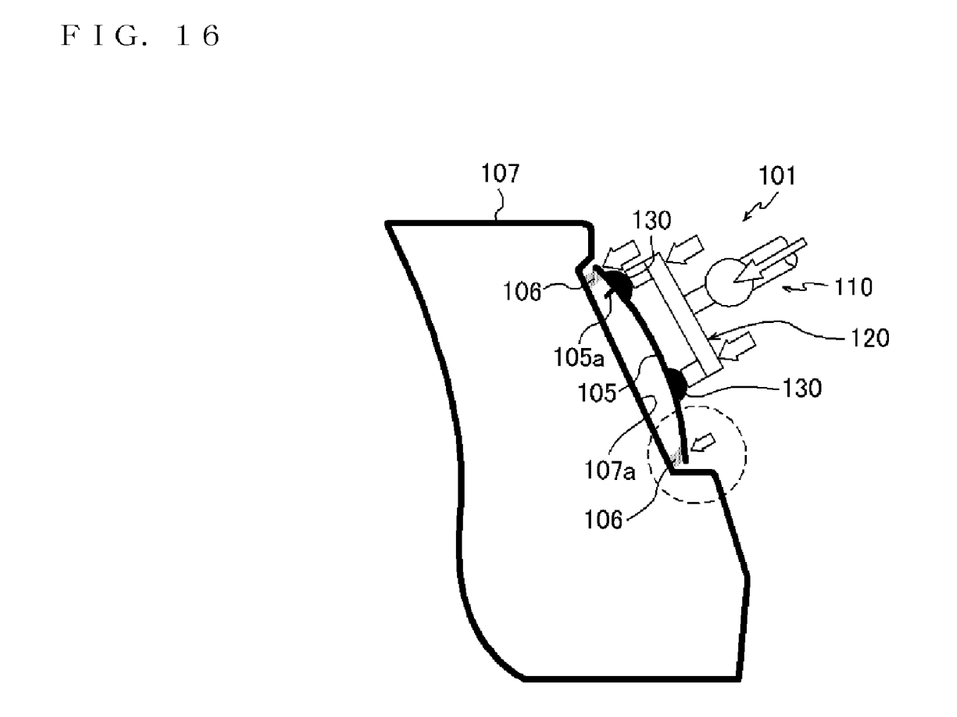
FIG. 16 is a side view showing the state contacting the window to the frame such that the pressing force applied to the lower-end of the window is larger than the that to the upper-end of the window, when the holding member holds the window with equal dimensions from the upper-end of the window to upper pads in the holder and from the lower-end of the window to lower pads in the holder, and pressed it to the frame.

When the window 105 is held with the hold member to make the dimension db longer than dimension da and is pressed to the window frame 107a, the hold member 120 is pressed with the robot arm 110 to apply the equal pressing forces to the window 105 from each of the pads 130 as shown in FIG. 16; however, the lower-end of the window 105 is contacted to the frame 107a with lighter force than the upper-end of the window 105.

Thus, the adhesive 106 coating the lower-end of the window 105 is squashed badly, and the adhesion strength or the sealing property between the window 105 and the frame 107a may not be obtained all over the adhered periphery.

The objective of the invention is to provide an unexpected work conveying apparatus and work assembling method, enabled to equally press the peripheral edge of the work to the assembling object, when there occurs a variation in the holding position of the work involving the window by the hold member of the apparatus or in the position of the assembling object involving the vehicle transferred to the line with respect to the apparatus, and when one-type hold member holds and assembles the various-sizes or -forms works to the assembling object.

DISCLOSURE OF THE INVENTION

A work conveying apparatus of the first aspect of the present invention, includes a holder having pads for holding the work at plural places of the work, a support arm for supporting the holder to transfer three-dimensionally, and a controller for controlling an action of the support arm, and holds the work by the holder, conveys the held work to an assemble position of an assembling object and presses to assemble the work to the assemble position, in which the pads are provided with force detecting sensors for detecting forces applied to the pads, and in which the controller controls the action of the support arm on the basis of the detected values of the force detecting sensors of the pads when assembling the work to the assemble position of the assembling object.

Due to the above structure, controlling the action of the arm to apply equal forces to the pads including the sensors, the work can be contacted to the assemble position of the assembling object with equal pressing force. The work can be set to the assembling object with proper posture, thereby improving the setting accuracy of the work.

Especially, if the work is a window and the assemble position of the assembling object is a window frame of a vehicle body, a peripheral edge of the window coated with the adhesive is contacted to the frame with equal pressing force, therefore, the adhesive coating all over the peripheral edge of the window can be equally squashed, and the adhesion strength or the sealing property between the window and the frame can be obtained all over the adhered periphery, thereby improving the setting accuracy of the window to the frame.

In the preferable embodiment of the work conveying apparatus of the present invention, the action of the arm is based on the detected values of the sensors and is controlled to equally press all over a peripheral edge of the work to the assembling object.

Due to the above structure, the work can be set to the assembling object with proper posture, thereby improving the setting accuracy of the work. Especially, if the work is the window and the assemble position of the assembling object is the frame of the vehicle body, the adhesive coating all over the peripheral edge of the window can be equally squashed, and the adhesion strength or the sealing property between the window and the frame can be obtained all over the adhered periphery, thereby improving the setting accuracy of the window to the frame.

In the advantageous embodiment of the work conveying apparatus of the present invention, the arm is constructed as a link mechanism containing multiple rotatable links, and the action of the arm is based on the detected values of the force detecting sensors and is controlled by changing the postures of the links.

Due to the above structure, when the work is assembled to the assemble position of the assembling object and the peripheral edge of the work is not equally pressed to the assemble position, the work can be corrected to contact the peripheral edge thereof to the assemble position with equal pressing force, changing the press direction of the holder by the arm.

Especially, if the work is the window and the assemble position of the assembling object is the frame of the vehicle body, the window can be corrected to contact the peripheral edge thereof to the assemble position with equal pressing force, changing the press direction of the holder by the arm, therefore, the adhesive coating all over the peripheral edge of the window can be equally squashed, and the adhesion strength or the sealing property between the window and the frame can be obtained all over the adhered periphery, thereby improving the setting accuracy of the window to the frame.

In the alternative embodiment of the work conveying apparatus of the present invention, the work conveying apparatus includes a driving member disposed at a joint of the arm to the holder and for changing a posture of the holder three-dimensionally against the arm, in which the action of the arm is based on the detected values of the force detecting sensors and is controlled by rotating the holder against the arm with the driving member.

Due to the above structure, the force contacting the work to the assemble position can be adjusted, therefore, the work can be set to the assembling object with proper posture, contacting the work to the assemble position with equal force in spite of the holding position by the holder and so on, thereby improving the setting accuracy of the work.

Especially, if the work is the window and the assemble position of the assembling object is the frame of the vehicle body, the window can be pressed to contact to the assemble position with equal force in spite of the holding position by the holder and so on, therefore, the adhesive coating all over the peripheral edge of the window can be equally squashed, and the adhesion strength or the sealing property between the window and the frame can be obtained all over the adhered periphery, thereby improving the setting accuracy of the window to the frame.

In the other embodiment of the work conveying apparatus of the present invention, the work conveying apparatus includes a break equipment disposed at the joint of the arm to the holder switching a lock position where the posture of the holder against the arm is fixed or a release position where the posture of the holder against the arm changes freely, in which the action of the arm on the basis of the detected values of the sensors is controlled by switching the lock position or the release position.

Due to the above structure, when the work is set to the assemble position with difference in the inclinations the work and the assemble position, and the work is one-side-contacted to the assemble position, the posture of the work is corrected to the proper posture by controlling for the action of the arm, the work can be set to the assembling object with proper posture, thereby improving the setting accuracy of the work.

Especially, if the work is the window and the assemble position of the assembling object is the frame of the vehicle body, when the window is set to the frame with difference in the inclinations the window and the frame, the window is one-side-contacted to the frame, the posture of the window is corrected to the proper posture by controlling for the action of the arm, therefore, the adhesive coating all over the peripheral edge of the window can be equally squashed, and the adhesion strength or the sealing property between the window and the frame can be obtained all over the adhered periphery, thereby improving the setting accuracy of the window to the frame.

A work assembling method of the second aspect of the present invention, uses a work conveying apparatus including a holder having pads for holding the work at plural places of the work, a support arm for supporting the holder to transfer three-dimensionally, and a controller for controlling the action of the arm, holding the work by the holder, conveying the held work to an assemble position of an assembling object, pressing to assemble the work to the assemble position; and the assembling method includes detecting forces applied to the pads when assembling the work and controlling the action of the arm on the basis of the detected forces applied to the pads.

Due to the above structure, the work can be contacted to the assemble position of the assembling object with overall equal pressing force, controlling the action of the arm to apply equal forces to the pads including the sensors. The work can be set to the assembling object with proper posture, thereby improving the setting accuracy of the work.

Especially, if the work is a window and the assemble position of the assembling object is a window frame of a vehicle body, because of contacting the peripheral edge of the window coated with the adhesive to the frame with equal pressing force, the adhesive coating all over the peripheral edge of the window can be equally squashed, therefore, the adhesion strength or the sealing property between the window and the frame can be obtained all over the adhered periphery, thereby improving the setting accuracy of the window to the frame.

In the preferable embodiment of the work assembling method of the present invention, the action of the arm is based on the detected forces applied to the pads and is controlled to equally press all over a peripheral edge of the work to the assembling object.

Due to the above structure, the work can be set to the assembling object with proper posture, thereby improving the setting accuracy of the work.

Especially, if the work is the window and the assemble position of the assembling object is the frame of the vehicle body, the adhesive coating all over the peripheral edge of the window can be equally squashed, therefore, the adhesion strength or the sealing property between the window and the frame can be obtained all over the adhered periphery, thereby improving the setting accuracy of the window to the frame.

In the advantageous embodiment of the work assembling method of the present invention, the arm is constructed as a link mechanism containing multiple rotatable links, and the action of the arm is based on the detected forces applied to the pads and is controlled by changing postures of the links.

Due to the above structure, when the work is assembled to the assemble position of the assembling object and the peripheral edge of the work is not equally pressed to the assemble position, it can be corrected that the peripheral edge of the work is contacted to the assemble position with equal pressing force, changing the press direction of the holder by the arm.

Especially, if the work is the window and the assemble position of the assembling object is the frame of the vehicle body, it can be corrected that the peripheral edge of the work is contacted to the assemble position with equal pressing force, changing the press direction of the holder by the arm, and the adhesive coating all over the peripheral edge of the window can be equally squashed, therefore, the adhesion strength or the sealing property between the window and the frame can be obtained all over the adhered periphery, thereby improving the setting accuracy of the window to the frame.

In the alternative embodiment of the work assembling method of the present invention, the method includes a step of providing a driving member disposed at the joint of the arm to the holder and for changing a posture of the holder three-dimensionally against the arm, in which the action of the arm is based on the detected forces applied to the pads and is controlled by rotating the holder against the arm with the driving member.

Due to the above structure, the force contacting the work to the assemble position can be adjusted, and the work can be set to the assembling object with proper posture, contacting the work to the assemble position with equal force in spite of the holding position with the holder and so on, thereby improving the setting accuracy of the work.

Especially, if the work is the window and the assemble position of the assembling object is the frame of the vehicle body, the window can be pressed to contact the work to the assemble position with equal force in spite of the holding position with the holder, and the adhesive coating all over the peripheral edge of the window can be equally squashed, therefore, the adhesion strength or the sealing property between the window and the frame can be obtained all over the adhered periphery, thereby improving the setting accuracy of the window to the frame.

In the other embodiment of the work assembling method of the present invention, the method includes a step of providing the break equipment disposed at the joint of the arm to the holder and for switching the lock position where the posture of the holder against the arm is fixed or the release position where the posture of the holder against the arm changes freely, in which the action of the arm on the basis of the detected forces applied to the pads is controlled by switching the lock position or the release position.

Due to the above structure, when the work is set to the assemble position with difference in the inclinations the work and the assemble position, and the work is one-side-contacted to the assemble position, the posture of the work is corrected to the proper posture by controlling for the action of the arm, the work can be set to the assembling object with proper posture, thereby improving the setting accuracy of the work.

Especially, if the work is the window and the assemble position of the assembling object is the frame of the vehicle body, when the window is set to the frame with difference in the inclinations the window and the frame, and the window is one-side-contacted to the frame, the posture of the window is corrected to the proper posture by controlling for the action of the arm, and the adhesive coating all over the peripheral edge of the window can be equally squashed, therefore, the adhesion strength or the sealing property between the window and the frame can be obtained all over the adhered periphery, thereby improving the setting accuracy of the window to the frame.

Mentioned above, due to the present invention, the work can be contacted to the assemble position of the assembling object with equal pressing force in all the contact area, and the work can be set to the assembling object with proper posture, thereby improving the setting accuracy of the work.

The Best Mode For Carrying Out The Invention

A work conveying apparatus 1 conveys, positions and sets a work to the given position three-dimensionally, with intended by an operator, in concert with the operator or by itself. The work is difficult for the operator to transfer, set, or assemble (called "a large work" involving a front window or a rear window).

Figure 1:
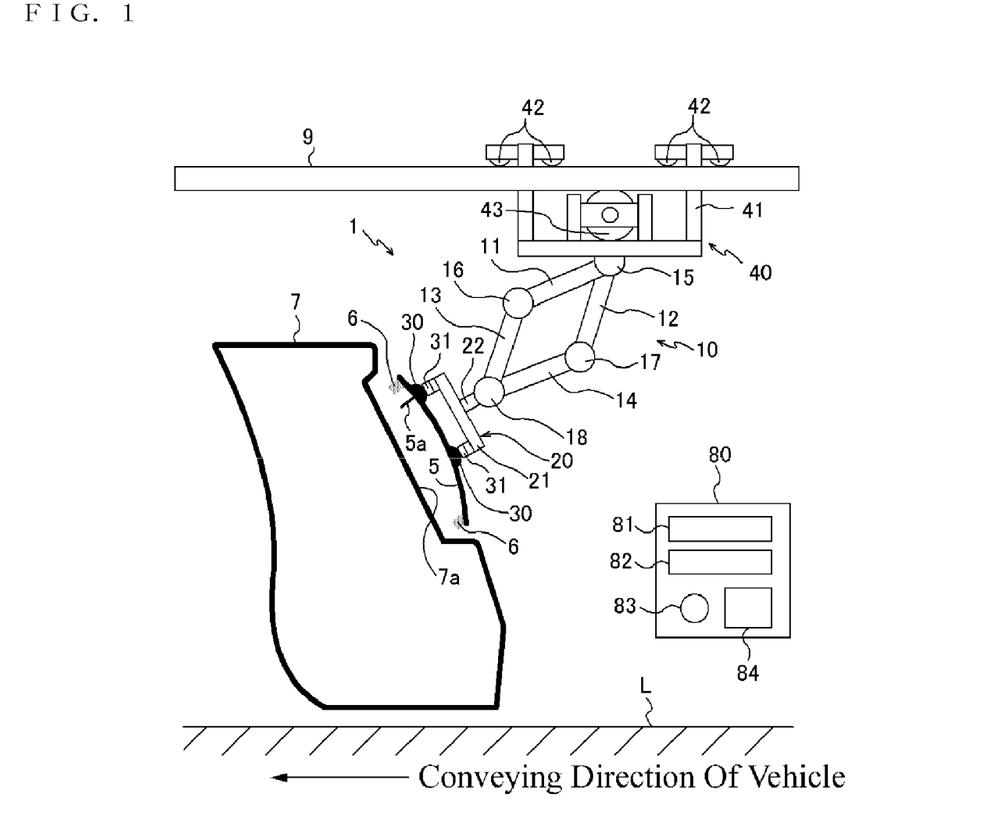
FIG. 1 is a side view showing a work conveying apparatus.

The work conveying apparatus 1 positions and sets a rear window 5 as the work to a window frame 7a of a vehicle 7, which is transferred to the left along an assembly line L shown in FIG. 1. The work conveying apparatus 1 includes a holder 20, a support arm 10, a driving trolley 40 and a controller 80. The holder 20 holds the window 5. The arm 10 three-dimensionally supports the holder 20. The trolley 40 is disposed above the arm 10, and supports and transfers the arm 10 along the parallel direction of the assembly line L. The controller 80 controls the arm 10 and so on.

The work conveying apparatus 1 positions and sets the window 5 to the frame 7a of the vehicle 7, but it may be applied to apparatuses which sets the other window such as a front window or a side window, the other parts such as a bonnet or the like.

The trolley 40 includes a main body 41, following wheels 42 and a driving wheel 43. The wheels 42 are attached to the body 41, and are engaged to a rail 9 from the upper side laid down in the transfer direction of the assembly line L. The wheel 43 is attached to the body 41, and is contacted to the bottom of the rail 9. The wheels 42 and the wheel 43 clamp the rail 9 in the vertical direction, so that the trolley 40 is supported by the rail 9.

The driving wheel 43 is driven for rotating by the controller 80, so that the trolley 40 can travel to the parallel direction of the assembly line L.

The arm 10 is constructed as a quadrate closed loop link mechanism, which is connected by a first upper link 11, a second upper link 12, a first lower link 13 and a second lower link 14. The ends of the links 11 and 12 are connected by an upper joint 15, the joint 15 is supported by the body 41, the ends of the links 13 and 14 are connected by a lower joint 18, the ends of the links 11 and 13 are connected by a first middle joint 16, the ends of the links 12 and 14 are connected by a second middle joint 17.

The joint 15 is an active joint rotatably supporting the links 11 and 12 in the direction of the assembly line L, including motors, in which the one rotates the link 11 around the joint 15, the other rotates the link 12 around the joint 15.

An offset link 22 is connected to the lower joint 18 and is extended from a body 21 of the holder 20. The joint 18 is a driving joint including a motor rotating the link 22 to the joint 18 three-dimensionally.

The motor included in the joint 18 rotates the link 22, so that the posture of the holder 20 against the arm 10 can be changed three-dimensionally.

The joint 18 is constructed such that the holder 20 can be rotated with respect to the arm 10 in the pitching and the rolling directions.

In the other embodiment, the joint 18 may be constructed such that the holder 20 can be rotated with respect to the arm 10 in the yawing direction.

The first middle joint 16 is a passive joint rotatably supporting the links 11 and 13 in the direction of the assembly line L, and the second middle joint 17 is a passive joint rotatably supporting the links 12 and 14 in the direction of the assembly line L.

Note that the arm 10 is not especially limited to be configured as the closed quadrate loop mechanism connected by the links, and may be configured as a link mechanism connected by the different numbers of the link in series or as a stretching arm member such as a cylinder.

Figure 2:
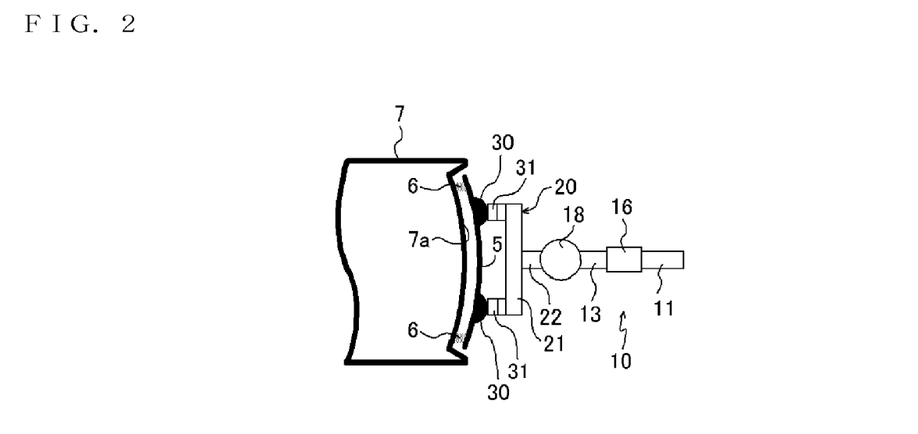
FIG. 2 is a plan view showing a support arm and pads of the work conveying apparatus.
Figure 3:
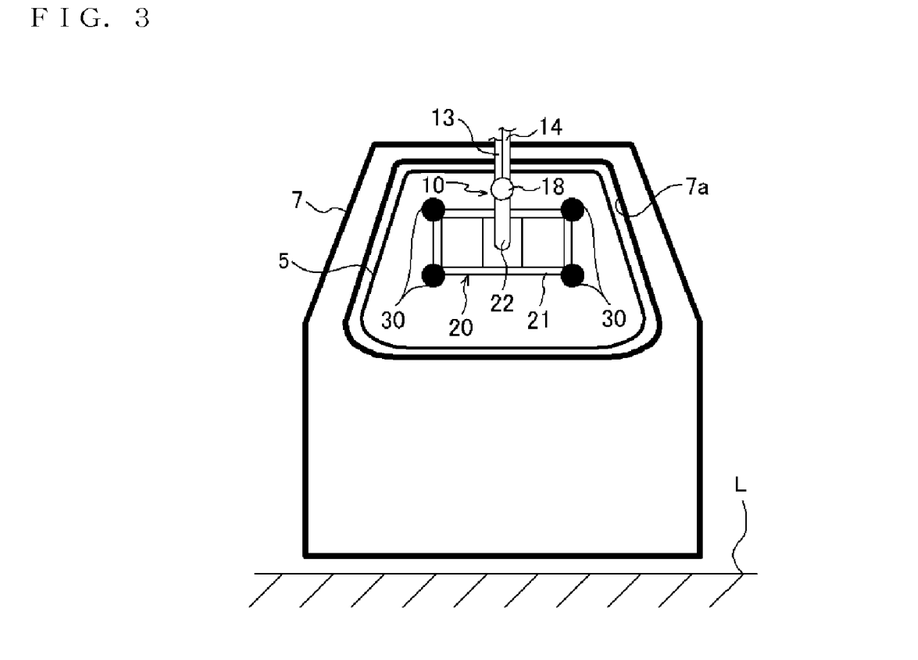
FIG. 3 is a rear view showing the pads of the work conveying apparatus.

The holder 20 includes multiple suction pads 30 (four pads) to hold the window 5; the pads 30 are disposed at the body 21 of the holder 20.

Note that the number of the pads 30 is not especially limited to be four, which is the same number of the corners of the window 5, and the holder 20 may include the three or more than four pads.

Each pad 30 has a sensor 31 for detecting the force applied to the pad 30.

The controller 80 has a trolley control unit 81, an arm control unit 82, a push button 83, a calculate unit 84. The unit 81 drives the wheel 43, and the trolley 40 travels to the direction of the assembly line L. The unit 82 controls the motors of the joints 15, 18, and the driving of the arm 10 is controlled. The button 83 is pushed, and the apparatus 1 presses the window 5 to the frame 7a of the vehicle 7 when the window 5 is assembled to the frame 7a of the vehicle 7. The unit 84 calculates the difference between the input values, which are detected by the sensors 31, and the like.

In the embodiment, the units 81, 82 drive either the trolley 40 or the arm 10, or both of them to perform the pressing of the window 5 to the frame 7a.

In the work conveying apparatus 1 constructed above, the window 5 is set and assembled to the frame 7a of the vehicle 7 as following.

First, the windows 5 are stocked in the work yard located near the assembly line L, the peripheral edge of the window 5 is coated with an adhesive 6, and the window 5 is held by the pads 30 of the holder 20 and conveyed near the frame 7a of the vehicle 7 by the arm 10. In this time, the posture of the window 5 is adjusted to the frame 7a.

The structure for conveying the window 5 may be provided, for example by driving the arm 10 to cooperate with the operation, in which the operator handles the holder 20 (that is the operator and the apprataus 1 cooperate in working), or by conveying window 5 and adjusting the posture of the window 5 by using the arm 10.

Then, the window 5 conveyed near the frame 7a is set and fitted to the frame 7a. When the window 5 is set to the frame 7a, the operator pushes the button 83 of the controller 80, fixing the posture of the holder 20 against the arm 10 and driving the arm 10, and the holder 20 presses the window 5 to the frame 7a side.

Thus, the window 5 is pressed to the frame 7a, so that the adhesive 6 coating the peripheral edge of the window 5 is pressed between the window 5 and the frame 7a, the window 5 is assembled to the frame 7a.

When the window 5 is assembled to the frame 7a, a stopper 5a arranged in the upper portion of the window 5 (see FIG. 1) is inserted to the hole formed in the frame 7a, so that the window 5 assembled to the vehicle 7 is prevented from falling therefrom. In the apparatus 1, some pads 30 transfering the pressure from the arm 10 to the window 5 are disposed near the stopper 5a to insert the stopper 5a into the hole of the frame 7a exactly.

Mentioned above, in the case that the window 5 is conveyed and assembled to the frame 7a by the apparatus 1, in order to obtain the adhesion strength and the sealing property between the window 5 and the frame 7a all over the adhered periphery by means of pressing overall the adhesive 6 coating the peripheral edge of the window 5, the peripheral edge of the window 5 to the frame 7a is desired to press equally.

Figure 4:
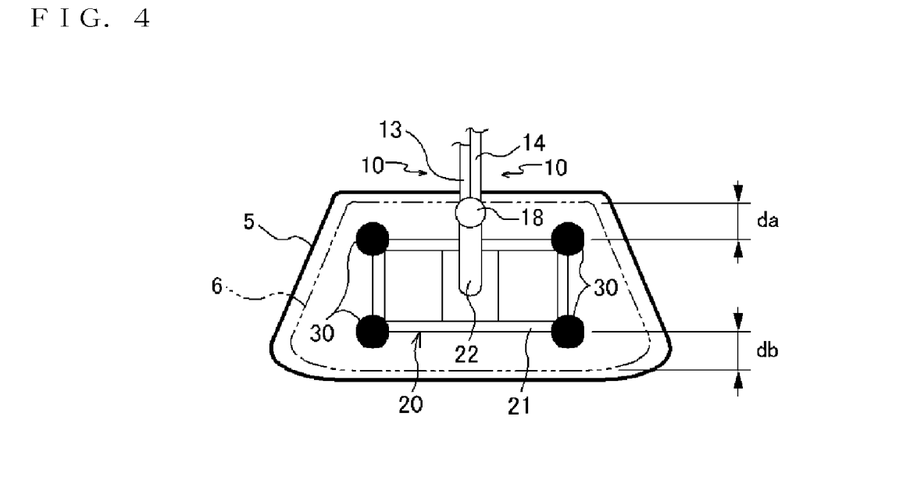
FIG. 4 is a rear view showing the holder in the state holding a rear window with equal dimensions from an upper-end of the window to upper pads in the holder and from a lower-end of the window to lower pads in the holder.

For example, as shown in FIG. 4, in the situation that the window 5 is held by the holder 20 with keeping two dimensions same: one dimension da from the upper-end of the window 5 to the upper pads 30, 30; and the other dimension db from the lower-end of the window 5 to the lower pads 30, 30, when the window 5 is set to the frame 7a, the holder 20 is pressed by the arm 10 with equal pressure to the pads 30, as the conventional method as shown in FIG. 14, in which all over the peripheral edge of the window 5 can be equally pressed to the frame 7a.

As mentioned before, when the arm 10 presses to the holder 20, the action of the arm 10 is controled to equally press the pads 30, so that the peripheral edge of the window 5 is contacted to the frame 7a with eqaul pressure. However, if the pressing action of the holder 20 is thus controled by the arm 10, it may fail to press the holder 20 for applying the pressing forces equally to the pads 30, because of the variaition in the holding position of the window 5 by the holder 20, or the variaition in the position of the vehicle 7 transfered in the assembly line L against the work conveying apparatus 1.

Thus, when the pressing forces by the press action of the arm 10 are unequally applied to the pads 30, the arm 10 is controlled as following, so that all over the peripheral edge of the window 5 is equally pressed to the frame 7a.

Figure 5:
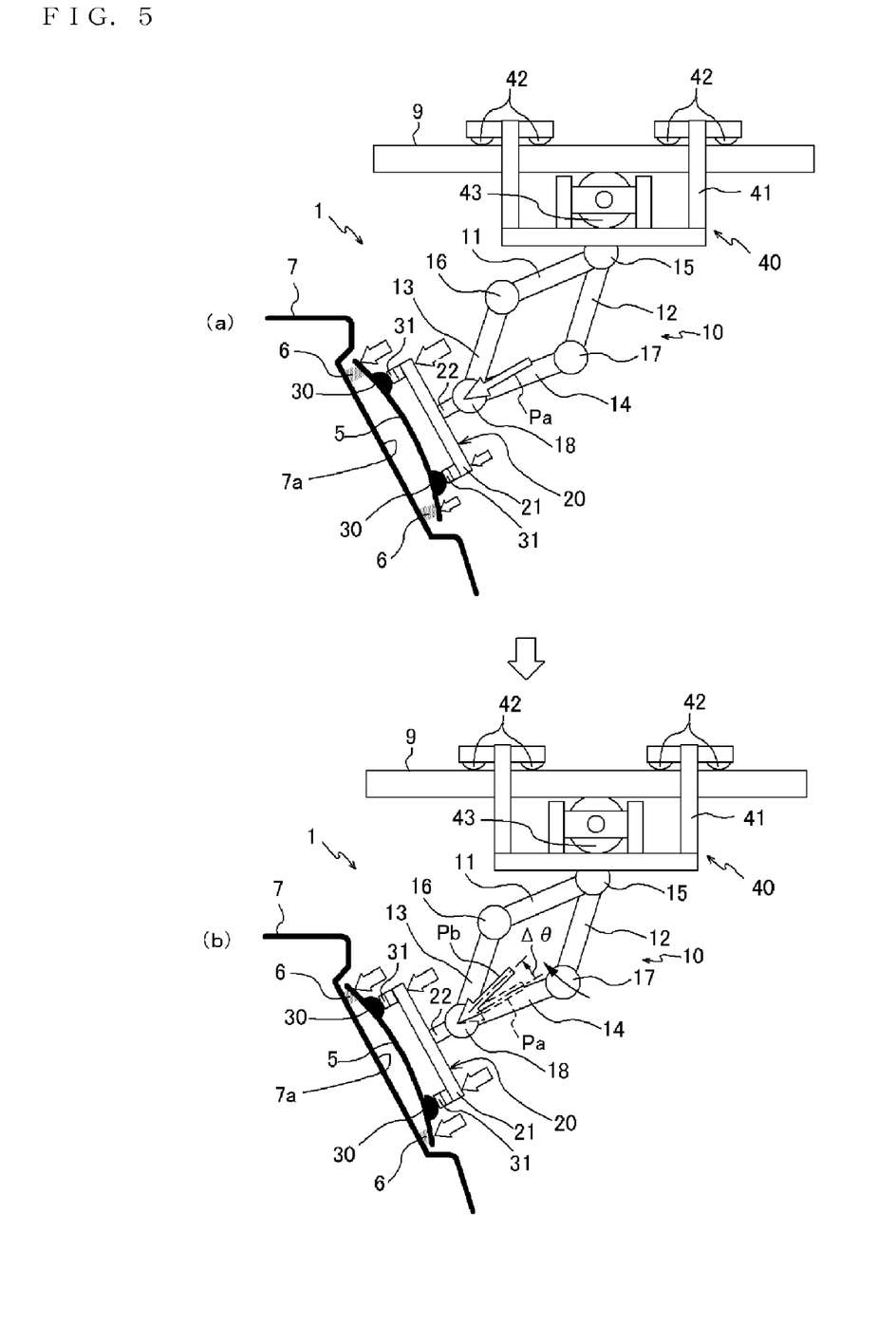
FIG. 5 is a side view showing the method of controlling the arm action for contacting equally all over the peripheral edge of the window to a frame, when the pressing forces are equally applied to the pads of the holder by the holder-pressing action.

As shown in FIG. 5 (a), when the holder 20 is pressed to the arrow Pa direction by the arm 10 (in the direction perpendicular to the holding face of a holder body 21 (the face parallel to the face of the window 5)), and the forces applied to the upper pads 30 of the holder 20 become larger than the forces applied to the lower pads 30, also in the peripheral edge of the window 5, the upper-end of the window 5 is contacted to the frame 7a more strongly than the lower-end of the window 5.

Thus, when the forces applied to pads 30 are uneven, the action of the arm 10 is controlled as following, so that the force to be applied to the each pad 30 becomes uniform.

As shown in FIG. 5 (b), the action of the arm 10 is controlled to change the postures of the links 12, 14, and the press direction of the holder 20 by the arm 10 is changed from the arrow Pa direction to the arrow Pb direction, so that the force to be applied to each pad 30 becomes even.

Concretely, the link 12 is rotated to the direction closing the angle between the links 11 and 12 from the posture shown in FIG. 5 (a), driving the motor of the joint of the arm 10, and the closed links 12, 14 connected at the joint 17 are opened, so that the press direction of the arm 10 to the holder 20 is changed to the arrow Pb direction rotating by $\Delta\theta$ from the arrow Pa direction.

In this case, since the arrow Pb direction is inclined by $\Delta\theta$ from the direction perpendicular to the holding-face of the body 21 toward the lower side direction, if the holder 20 is pressed to the arrow Pb direction, the forces applied to the lower pads 30, 30 are larger than the forces when the holder 20 is pressed to the arrow Pa direction, so that the forces applied to the lower pads 30, 30 become equal to the forces applied to the upper pads 30, 30.

Mentioned above, in case that the press direction to the holder 20 by the arm 10 is changed to control the action of the arm 10, the action of the arm 10 is controlled on the basis of the detected values of the sensors 31 disposed on the pads 30.

In this case, the detected value of the sensor 31 for detecting the force applied to the pad 30 is transmitted to the unit 84 of the controller 80, and the unit 84 calculates the difference values among the detected values, which are detected by each sensor 31.

When the difference value in the detected values of the sensors 31 is larger than the value given in advance, decided that the arm 10 is pressed unequally to the holder 20, the action of the arm 10 is controlled to make all the difference values smaller than the given value, and the press direction of the arm 10 is adjusted.

On the other hand, when the difference value in the detected values of the sensors 31 is smaller than the value given in advance, decided that the arm 10 is pressed equally to the holder 20, the press direction of the arm 10 is not changed.

The action of the arm 10 is not especially limited to be controlled by changing the postures of the links 12, 14, may be controlled by changing links 11, 13 in response to the relation between the forces applied to the upper and lower pads 30, by changing the posture of links 11, 12, 13, 14, or by changing the posture of one of the links 11, 12, 13, 14 applying equally the forces to the pads 30.

Thus, when the window 5 is assembled to the frame 7a, if the arm 10 presses unequally to the pads 30, the action of the arm 10 is controlled to change the posture of the links 11, 12, 13, 14 on the basis of the differences of the detected values of the sensors 31, the press direction of the arm 10 against the holder 20 is adjusted, and the force from the arm 10 is adjusted to apply equally the forces to the pads 30.

For example, when the window 5 is contacted to the frame 7a with light pressure, the pressing force to the holder 20 is adjusted after the press direction is adjusted, the window 5 is mounted into the frame 7a (for example, after adjusting, pushing the button 83), the pressing force is adjusted to squash the adhesive 6 coated on the peripheral edge of the window 5.

Due to the above structure, when the window 5 is assembled to the frame 7a, if the peripheral edge of the window 5 is not equally pressed to the frame 7a, the action of the arm 10 is controlled to change the posture of links 11, 12, 13, 14, the forces applied to the pads 30 are equal, changing the press direction of the holder 20 by the arm 10, so that it can be obtained that the peripheral edge of the window 5 is contacted to the frame 7a with equal pressing force. Thus, the adhesive 6 coating all over the peripheral edge of the window 5 can be equally pressed, the adhesion strength or the sealing property between the window 5 and the frame 7a is obtained all over the adhered periphery.

Figure 6:
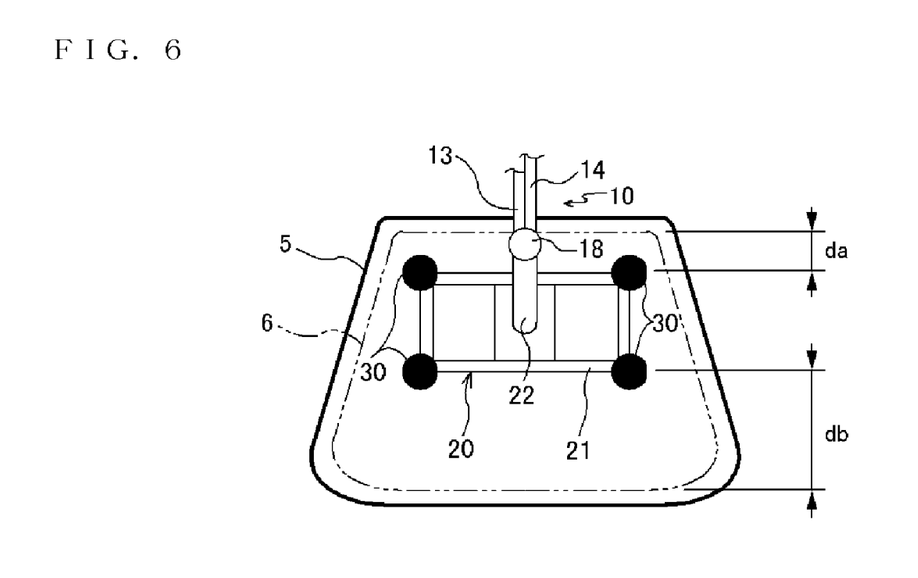
FIG. 6 is a rear view showing the holder in the state holding the window to make dimension from the lower-end of the window to lower pads in the holder larger than the dimension from the upper-end of the window to upper pads in the holder.

When using the holder 20 in which the pads 30 are arranged to hold the small-sized window 5 and holding the large-sized window 5 and assembling it to the frame 7a, the upper pads 30, 30 are disposed near the stopper 5a, so that the upper dimension da is longer than the lower dimension db as shown in FIG. 6.

Figure 7:
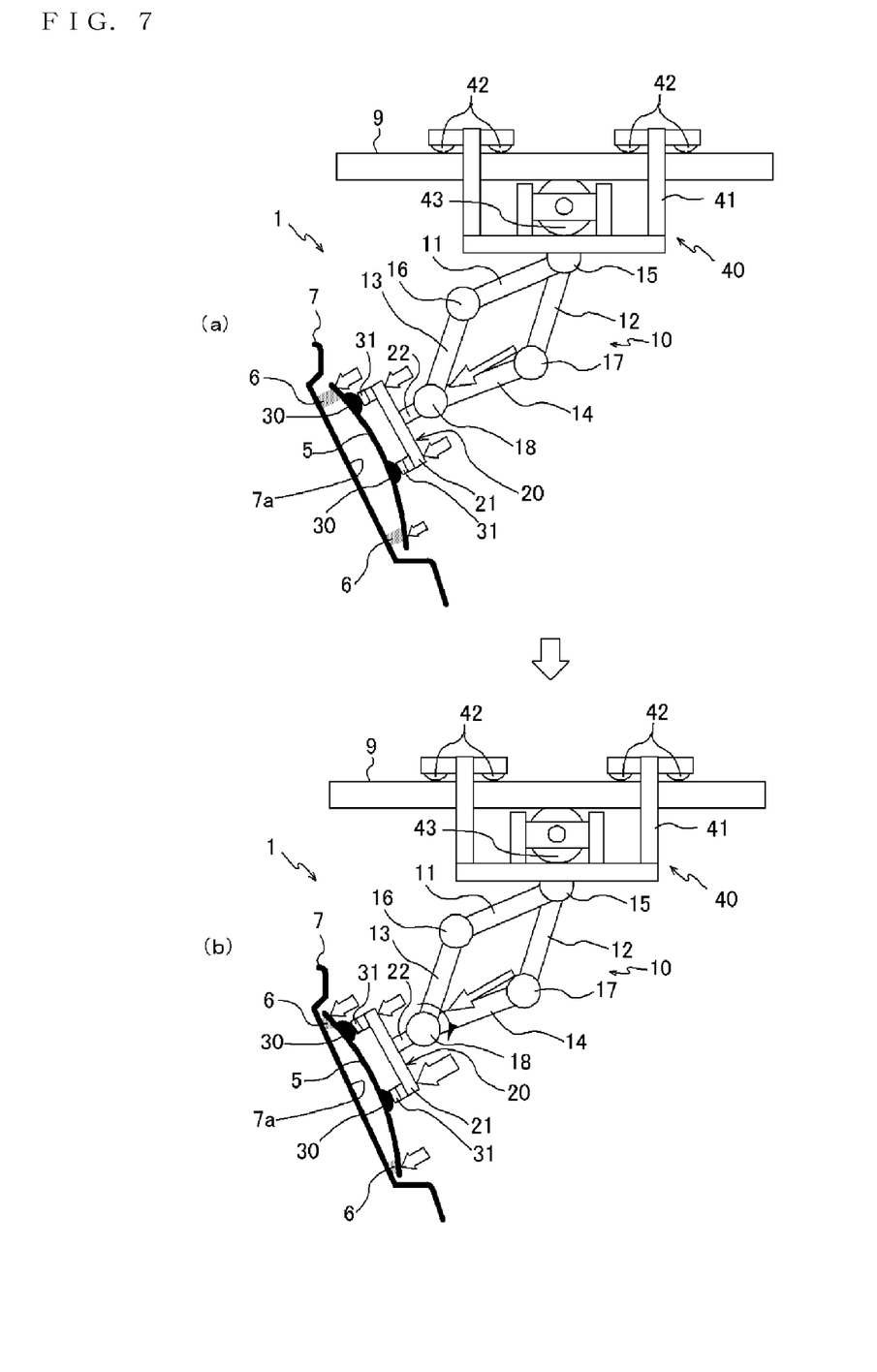
FIG. 7 is a side view showing the method of controlling the arm action for contacting equally all over the peripheral edge of the window to the frame, when the holder holds the window to make dimension from the lower-end of the window to lower pads in the holder larger than the dimension from the upper-end of the window to upper pads in the holder.

Thus, when the holder 20 holds the window 5 with difference in the dimensions da and db, if the holder 20 is pressed to apply equally the forces to the pads 30 as shown in FIG. 7 (*a*), the forces contacting the edges in periphery (the sides) of the window 5 to the frame 7a are different.

For example, when the holder 20 holds the window 5 to make the dimensions db longer than the dimension da, the upper side of the window 5 contacts to the frame 7a more strongly than the lower side.

Thus, when the holder 20 holds the window 5 with difference in the dimensions da and db, the action of the arm 10 is controlled as following, so that the all over peripheral edge of the window 5 is contacted to the frame 7a with an equal force.

As shown in FIG. 7 (*b*), the motor of the joint 18 of the arm 10 is driven, and the holder 20 is rotated to the direction where the face of the window 5 stands (the direction where the face of the window 5 becomes vertical; the pitching direction).

The holder 20 is thus rotated, and the forces applied to the lower pads 30 are increased from the posture as shown in FIG. 7 (*a*), also the forces applied to the upper pads 30 are decreased from the posture as shown in FIG. 7 (*a*), so the contact forces of the upper and lower edges of the window 5 are equalized.

Mentioned above, when the holder 20 is rotated against the arm 10 driving the motor of the joint 18 of the arm 10, the action of the arm 10 is controlled on the basis of the detected values of the sensors 31 disposed at the pads 30.

The detected values of the sensors 31 for detecting the forces applied to the pads 30 are transmitted to the unit 84 of the controller 80.

The vehicle-type information of the body 7 to which the window 5 is assembled is stored in advance, the unit 84 calculates the forces applied to the pads 30 on the basis of the transmitted information (for example, the information about the form and the size of the window 5, and the information about the holding position by the holder 20), when the all over peripheral edge of the window 5 is contacted to the frame 7a equally and properly.

Comparing each of the detected values of sensors 31 transmitted to the unit 84 with each of the calculated values of the forces applied to pads 30, the motor of the joint 18 is driven to rotate the holder 20 so as to make the detected values of sensors 31 equal to the calculated values of the forces applied to pads 30.

The adjustment of the force contacting the peripheral edge of the window 5 to the frame 7a by rotating the holder 20 with the motor of the joint 18 is performed when the difference value between each of the detected values of sensors 31 and each of the calculated values of the forces applied to pads 30 is larger than the given value, and in the case that it is smaller than the given value, no adjustment of the force contacting the peripheral edge of the window 5 to the frame 7a is performed.

Thus, when the window 5 is held by the holder 20 with difference in dimensions da and db and is assembled to the frame 7a, the motor of the joint 18 of the arm 10 is driven to rotate the holder 20, so that the force contacting the peripheral edge of the window 5 to the frame 7a is adjusted.

This adjustment is performed, for example, when the window 5 is contacted to the frame 7a with light pressure, after the adjustment, the window 5 is mounted into the frame 7a (for example, after adjusting, pushing the button 83) and the adhesive 6 coated on the peripheral edge of the window 5 is squashed.

Due to the above structure, when the window 5 is held by the holder 20 with difference in dimensions da and db and is assembled to the frame 7a, the motor of the joint 18 of the arm 10 is driven to rotate the holder 20, so that the force contacting the peripheral edge of the window 5 the frame 7a can be adjusted, so, the adhesive 6 coating all over the peripheral edge of the window 5 can be equally squashed, and the adhesion strength or the sealing property between the window 5 and the frame 7a can be obtained all over the adhered periphery.

Figure 8:
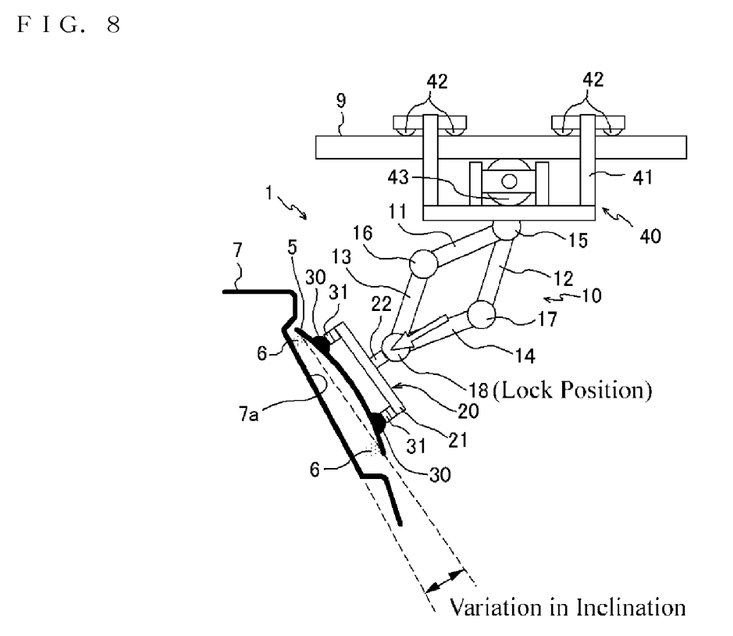
FIG. 8 is a side view showing the state the window is in one-side-contacted to the frame, when the window is set to the frame with different inclinations of the window and the frame.

As shown in FIG. 8, when the window 5 is assembled to the frame 7a, if the inclinations of the window 5 and frame 7a are different, the window may become the posture, called "one-side-contact", in which the upper-end side of the window 5 is contacted to the frame 7a and the lower-end side of the window 5 is not contacted to the frame 7a.

Thus, when the window 5 is mounted into the frame 7a in the one-side-contact, because of the fixed posture of the holder 20 against the arm 10, the force is applied to the lower pads 30, 30 of the window 5 more strongly than the force applied to the upper pad 30, 30.

Accordingly, the adhesive 6 coating the upper side of the window 5 is squashed well, the adhesive 6 coating the lower side is squashed badly, so that the adhesion strength or the sealing property is difficult to obtain between the window 5 and the frame 7a at all over adhered periphery.

So, when the window 5 is set to the frame 7a in the one-side-contact, the action of the arm 10 is controlled to contact all over the peripheral edge of the window 5 to the frame 7a with equal force as following.

The joint 18 of the arm 10 is provided with the break switching "the lock position" or "the release position": in the lock position, the brake allows the motor of the joint 18 drive to control the posture of the holder 20 against the arm (in the lock position, when the motor of the joint 18 is not driven, the posture of the holder 20 against the arm 10 is fixed); and in the release position, the posture of the holder 20 against the arm 10 changes freely.

Transfering the window 5 nearby the frame 7a with the arm 10, adjusting the posture of the window 5 to meet the frame 7a, and the window 5 is assembled to the frame 7a.

Figure 9:
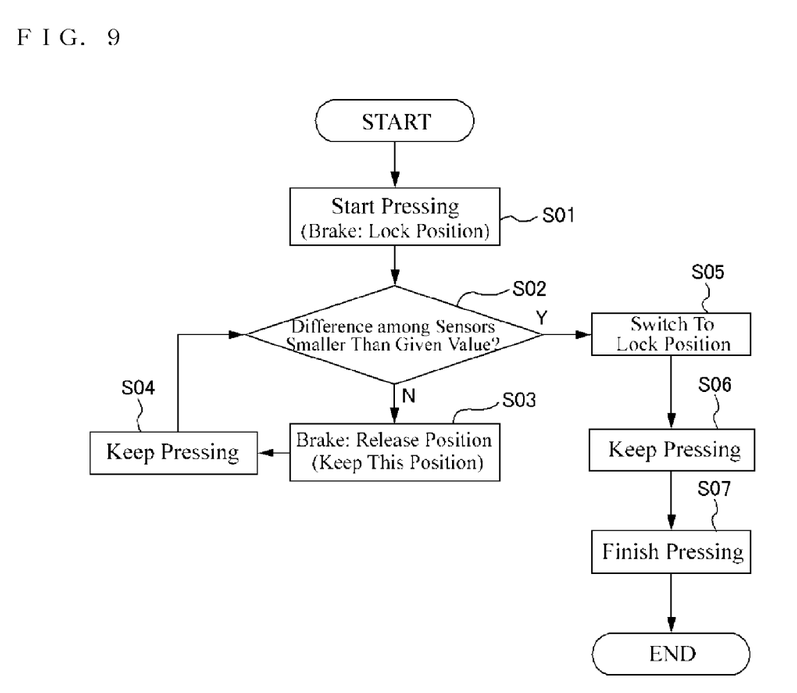
FIG. 9 is a flow chart showing the method of controlling the arm action for contacting equally all over the peripheral edge of the window to the frame, when the window is set to the frame with different inclinations of the window and the frame.

Subsequently, as shown in FIG. 9, pushing the button 83 of the controller 80, shifting the break of the joint 18 to "the lock potision", the arm 10 starts to press the window 5 to the frame 7a (S01).

When starting the action of the arm 10 for pressing the window 5 to the frame 7a, transmitting the detected values from the sensors 31 to the unit 84 of the controller 80, calculating the difference values among the detected values, the controller decides whether or not the difference values are smaller than the value given in advance (S02).

In the step S02, when the difference values are decided to be larger than the given value, the controller decides that the window 5 is not properly contacted to the frame 7a, involving the one-side-contacted as shown in FIG. 8, so the contacting posture of the window 5 to the frame 7a is corrected to contact all over the peripheral edge portion of the window 5 to the frame 7a with equal force.

When the difference values are decided to be larger than the given value, shifting the break to "the release position" (S03), the arm 10 keeps pressing (SO4).

Figure 10:
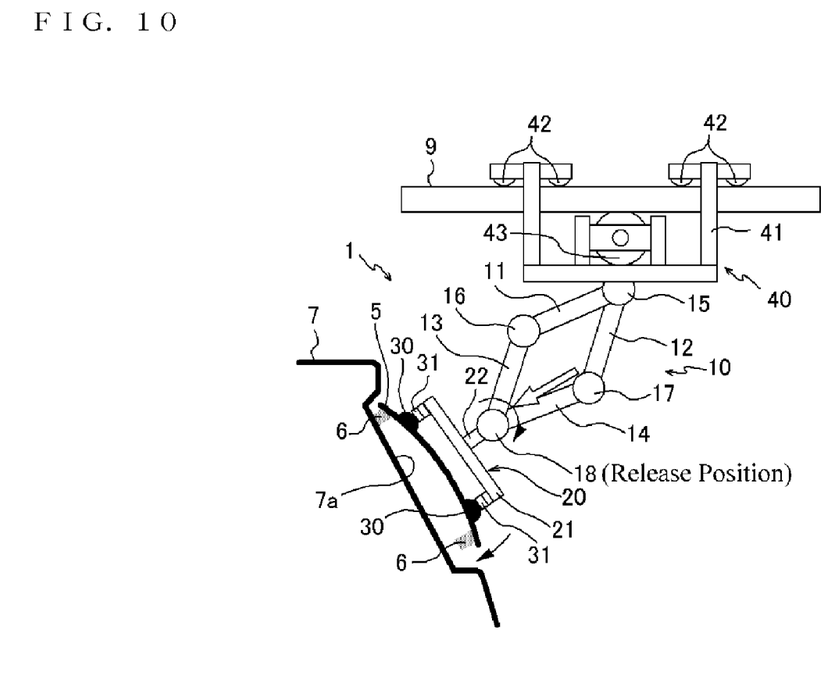
FIG. 10 is a view showing a break of a lower hinge of the arm in the state shifting to the release position, while pressing the window in the one-side-contacted to the frame.

Shifting the break of the joint 18 to "the release position", the holder 20 becomes to rotate three-dimensionally against the arm 10, so when the arm 10 keeps pressing the window 5 in the one-side-contact state shown in FIG. 8, the window 5 is rotated dawnward around the upper-end side thereof contacting to the frame 7a as shown in FIG. 10.

Rotating the window 5 dawnward by the press action of the arm 10, the lower-end side of the window 5 is contacted and pressed to the frame 7a.

When contacting the lower-end side of window 5 to the frame 7a, increasing the forces applied to the pads 30, 30 disposed at the lower holder 20, increasing the detected values of the sensors 31 disposed at the lower pads 30, 30, the diffference values among the detected values of the lower and upper sensors 31 become small, subsequently the diffference values become smaller than the value given in advance and as a result they become equal.

Figure 11:
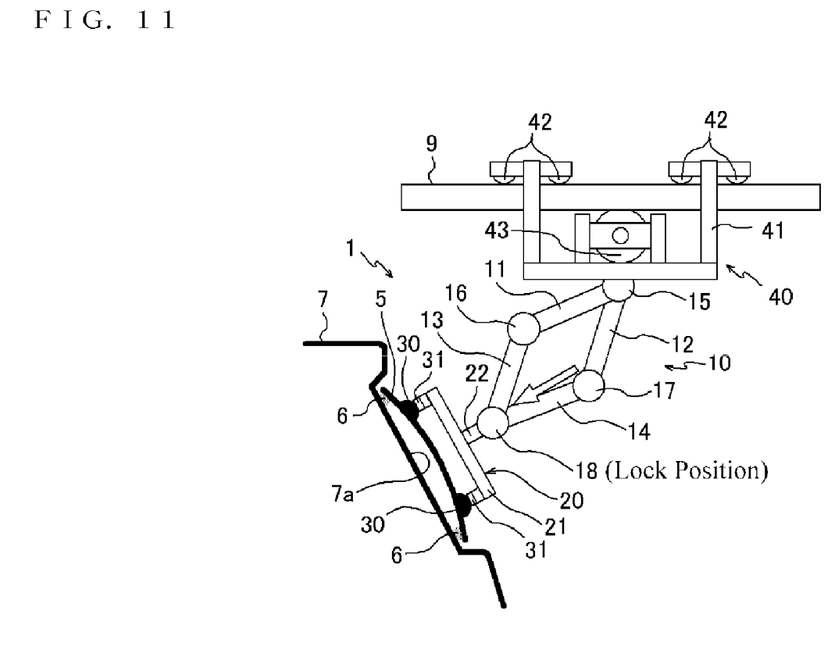
FIG. 11 is a view showing the break of the lower hinge of the arm in the state shifting to the lock position, after the window is equally contacted to the frame from the position shown in FIG. 10.

Shifting the break to "the release position" (S03), keeping the pressing action by the arm 10 (S04), the controller 80 repeats to decide whether the difference values among the detected values from each of the sensors 31 are smaller than the given value (S02), and when the difference values among the detected values from upper and lower sensors 31 are smaller than the given value as shown in FIG. 11, shifting the break to "the lock position" (S05), the arm 10 keeps pressing (S06).

Since when the difference values among the detected values from upper and lower sensors 31 are smaller than the given value, the peripheral edge of the window 5 is decided to contact equally to the frame 7a, the arm 10 presses the window 5 with keeping the contacting posture equally to the frame 7a.

Subsequently, when the detected values reach the desired value during keeping the press action (S06), the controller decides that the adhesive 6 coating all over the peripheral edge of the window 5 is well squashed, and the press action finishes (S07).

Thus, when the window 5 is set to the frame 7a with contacting badly to the frame 7a, the break is shifted to "the release position" to correct the posture of the window 5 to the normal posture, and then the break is shifted to "the lock position" again, and the arm 10 presses keeping the posture contacting equally the peripheral edge of the window 5 to the frame 7a.

So, even when the window 5 is set to the frame 7a with difference in inclinations of the window 5 and the frame 7a and becomes the one-side-contact to the frame 7a, correcting the posture of the window 5 properly by the action of the arm 10, squashing the adhesive 6 coating the peripheral edge portion of the window 5, the adhesion strength or the sealing property between the window 5 and the window frame 7a can be obtained all over the adhered periphery.

Industrial Applicability

The present invention is applicable in the industrial instrument as a work conveying apparatus, holding a work, conveying the work to an assembled position, and assembling the work to the assembled position with pressing.

The invention claimed is:

1. A work conveying apparatus comprising: a holder having pads for holding plural places of the work; a support arm for supporting the holder to transfer three-dimensionally; and a controller for controlling an action of the support arm, and holding the work by the holder, conveying the held work to an assemble position of an assembling object, pressing to assemble the work to the assemble position,
    wherein the pads are provided with force detecting sensors for detecting forces applied to the pads, and
    wherein the controller controls the action of the support arm on the basis of the detected values of the force detecting sensors of the pads and of the holding position of the work by the holder when assembling the work to the assemble position of the assembling object, and
    wherein the action of the support arm is controlled to equally press all over a peripheral edge of the work to the assembling object.

2. The work conveying apparatus as set forth in claim 1,
    wherein the support arm is constructed as a link mechanism containing multiple rotatable links, and
    wherein the action of the support arm is based on the detected values of the force detecting sensors and is controlled by changing postures of the links.

3. The work conveying apparatus as set forth in claim 1, further comprising:
    a driving member disposed at a joint of the support arm to the holder and for changing a posture of the holder three-dimensionally against the support arm,
    wherein the action of the support arm is based on the detected values of the force detecting sensors and is controlled by rotating the holder against the support arm with the driving member.

4. The work conveying apparatus as set forth in claim 1, further comprising:
    a break equipment disposed at the joint of the support arm to the holder and for switching a lock position where the posture of the holder against the support arm is fixed or a release position where the posture of the holder against the support arm changes freely,
    wherein the action of the support arm is based on the detected values of the force detecting sensors and is controlled by switching the lock position or the release position.

5. A work assembling method using a work conveying apparatus comprising: a holder having pads for holding plural places of the work; a support arm for supporting the holder to transfer three-dimensionally; and a controller for controlling an action of the support arm, and holding the work by the holder, conveying the held work to an assemble position of an assembling object, pressing to assemble the work to the assemble position, the assembling method comprising:
    detecting forces applied to the pads when assembling the work; and
    controlling the action of the support arm on the basis of the detected forces applied to the pads and the holding position of the work by the holder,
    wherein the action of the support arm is controlled to equally press all over a peripheral edge of the work to the assembling object.

6. The assembling method as set forth in claim 5,
    wherein the support arm is constructed as a link mechanism containing multiple rotatable links, and wherein the action of the support arm is based on the detected forces applied to the pads and is controlled by changing postures of the links.

7. The assembling method as set forth in claim 5, further comprising:
   providing a driving member disposed at a joint of the support arm to the holder and for changing a posture of the holder three-dimensionally against the support arm,
   wherein the action of the support arm is based on the detected forces applied to the pads and is controlled by rotating the holder against the support arm with the driving member.

8. The assembling method as set forth in claim 5, further comprising:
   providing a break equipment disposed at the joint of the support arm to the holder and for switching a lock position where the posture of the holder against the support arm is fixed or a release position where the posture of the holder against the support arm changes freely,
   wherein the action of the support arm is based on the detected forces applied to the pads and is controlled by switching the lock position or the release position.

* * * * *